(12) United States Patent
Tommy et al.

(10) Patent No.: US 11,068,779 B2
(45) Date of Patent: Jul. 20, 2021

(54) STATISTICAL MODELING TECHNIQUES BASED NEURAL NETWORK MODELS FOR GENERATING INTELLIGENCE REPORTS

(71) Applicant: Tata Consultancy Services Limited, Mumbai (IN)

(72) Inventors: Robin Tommy, Trivandrum (IN); Sarath Sivaprasad, Trivandrum (IN)

(73) Assignee: Tata Consultancy Services Limited, Mumbai (IN)

( * ) Notice: Subject to any disclaimer, the term of this patent is extended or adjusted under 35 U.S.C. 154(b) by 914 days.

(21) Appl. No.: 15/474,191

(22) Filed: Mar. 30, 2017

(65) Prior Publication Data
US 2018/0225569 A1    Aug. 9, 2018

(30) Foreign Application Priority Data

Feb. 9, 2017    (IN) .............................. 201721004688

(51) Int. Cl.
*G06N 3/08* (2006.01)
*G06F 16/51* (2019.01)
*G06K 9/62* (2006.01)
*G06F 30/20* (2020.01)
*G06F 111/10* (2020.01)

(52) U.S. Cl.
CPC ............. *G06N 3/08* (2013.01); *G06F 16/51* (2019.01); *G06F 30/20* (2020.01); *G06K 9/6217* (2013.01); *G06K 9/6267* (2013.01); *G06F 2111/10* (2020.01)

(58) Field of Classification Search
CPC ........ G06N 3/08; G06F 16/51; G06F 2111/10; G06F 30/20; G06K 9/6217; G06K 9/6267
See application file for complete search history.

(56) References Cited

U.S. PATENT DOCUMENTS

| 7,272,586 B2 | 9/2007 | Nauck et al. |
| 7,890,445 B2 | 2/2011 | Ben Hur et al. |
| 10,032,072 B1* | 7/2018 | Tran .................. H04N 5/23229 |
| 2002/0188424 A1 | 12/2002 | Grinstein et al. |
| 2005/0234955 A1* | 10/2005 | Zeng ..................... G06F 16/355 |
| 2010/0223276 A1* | 9/2010 | Al-Shameri ......... G06K 9/0063 707/769 |

(Continued)

OTHER PUBLICATIONS

Agostinelli et. al., "What time is it? Deep learning approaches for circadian rhythms", 2016 (Year: 2016).*

*Primary Examiner* — Li B. Zhen
*Assistant Examiner* — Selene A. Haedi
(74) *Attorney, Agent, or Firm* — Finnegan, Henderson, Farabow, Garrett & Dunner LLP

(57) ABSTRACT

Statistical modeling techniques based neural network models for generating intelligence reports is provided. The system obtains test dataset and training dataset, each of which include at least one of images and elements. Statistical modeling techniques are identified and selected based on the test dataset for normalizing the test dataset to obtain normalized dataset. The system further associates, using one or more clustering techniques a unique cluster head to at least one of (i) normalized elements set and (ii) normalized images set in the normalized dataset to obtain a labeled dataset. The labeled dataset is further analysed by integrated trained modeling techniques into neural network model(s) and intelligence reports are generated.

6 Claims, 2 Drawing Sheets

(56) References Cited

U.S. PATENT DOCUMENTS

| | | | |
|---|---|---|---|
| 2014/0372346 A1* | 12/2014 | Phillipps | G06N 20/00 706/12 |
| 2015/0302042 A1 | 10/2015 | Shirai et al. | |

* cited by examiner

STATISTICAL MODELING TECHNIQUES BASED NEURAL NETWORK MODELS FOR GENERATING INTELLIGENCE REPORTS

PRIORITY CLAIM

This U.S. patent application claims priority under 35 U.S.C. § 119 to: India Application No. 201721004688, filed on Feb. 9, 2017. The entire contents of the aforementioned application are incorporated herein by reference.

TECHNICAL FIELD

The disclosure herein generally relate to data analysis systems, and, more particularly, to statistical modeling techniques based neural network models for generating intelligence reports.

BACKGROUND

Data analytics brings the next wave in the era of computing on a network in some form or the other. In this new paradigm of computing, data analytics plays an important role since it offers solutions and services that are essential for making decisions. Many of the existing data analytics solutions monitor, manage and control information. However, many practical issues need to be addressed before they actually affect important aspects of making decisions. Performance Assurance is one such important requirement for wide acceptance of this solution. Traditional techniques involve processing large datasets and incur huge computational cost as the processes involved are computationally intensive. If the computation does not enhance the processing units of a system, then the system may not give desired output.

SUMMARY

Embodiments of the present disclosure present technological improvements as solutions to one or more of the above-mentioned technical problems recognized by the inventors in conventional systems. For example, in one aspect, a processor implemented method for statistical modeling techniques based neural network models for generating intelligence reports is provided. The method comprises: obtaining, via one or more hardware processors, a test dataset and a training dataset, wherein the test dataset and the training dataset comprises at least one of one or more images and a plurality of elements; determining, via the one or more hardware processors, one or more statistical modeling techniques from a plurality of statistical modeling techniques, based on the test dataset; normalizing, using the one or more determined statistical modeling techniques, the test dataset to obtain a normalized dataset, wherein the normalized dataset comprises at least one of one or more normalized elements set and one or more normalized images set; associating, using one or more clustering techniques, at least one unique cluster head to at least one of (i) the one or more normalized elements set and (ii) the one or more normalized images set in the normalized dataset to obtain a labeled dataset; and generating, using one or more neural network models, an intelligence report by analyzing the labeled dataset.

In an embodiment of the present disclosure, the step of normalizing the test dataset comprises filtering at least one of (i) one or more missing elements and one or more duplicate elements from the test dataset, and (ii) one or more missing images and one or more duplicate images from the test dataset. In an embodiment of the present disclosure, the method further comprises training, using the intelligence report and the test dataset, the one or more hardware processors, and generating subsequent incoming test datasets.

In an embodiment of the present disclosure, the plurality of statistical modeling techniques comprises one or more classification modeling techniques, and one or more regressive modeling techniques.

In another aspect, a system for statistical modeling techniques based neural network models for generating intelligence reports is provided. The system comprises a memory storing instructions; one or more communication interfaces; and one or more hardware processors coupled to said memory using said one or more communication interfaces, wherein said one or more hardware processors are configured by said instructions to: obtain a test dataset and a training dataset, wherein the test dataset and the training dataset comprises at least one of one or more images and a plurality of elements, determine one or more statistical modeling techniques from a plurality of statistical modeling techniques, based on the test dataset, normalize, using the one or more determined statistical modeling technique, the test dataset to obtain a normalized dataset, wherein the normalized dataset comprises at least one of one or more normalized elements set and one or more normalized images set, associate using one or more clustering techniques, at least one unique cluster head to at least one of (i) the one or more normalized elements set and (ii) the one or more normalized images set in the normalized dataset to obtain a labeled dataset, and generate, using one or more neural network models, an intelligence report by analyzing the labeled dataset.

In an embodiment of the present disclosure, the test dataset is normalized by filtering at least one of (i) one or more missing elements and one or more duplicate elements from the test dataset, and (ii) one or more missing images and one or more duplicate images from the test dataset.

In an embodiment, the one or more hardware processors are trained using the intelligence report to generate subsequent intelligence reports for subsequent incoming test datasets. In an embodiment, the plurality of statistical modeling techniques comprises one or more classification modeling techniques, and one or more regressive modeling techniques.

In yet another aspect, one or more non-transitory machine readable information storage mediums comprising one or more instructions is provided. The one or more instructions which when executed by one or more hardware processors causes obtaining, a test dataset and a training dataset, wherein the test dataset and the training dataset comprises at least one of one or more images and a plurality of elements; determining one or more statistical modeling techniques from a plurality of statistical modeling techniques, based on the test dataset; normalizing, using the one or more determined statistical modeling techniques, the test dataset to obtain a normalized dataset, wherein the normalized dataset comprises at least one of one or more normalized elements set and one or more normalized images set; associating, using one or more clustering techniques, at least one unique cluster head to at least one of (i) the one or more normalized elements set and (ii) the one or more normalized images set in the normalized dataset to obtain a labeled dataset; and generating, using one or more neural network models, an intelligence report by analyzing the labeled dataset.

In an embodiment of the present disclosure, the step of normalizing the test dataset comprises filtering at least one of (i) one or more missing elements and one or more duplicate elements from the test dataset, and (ii) one or more missing images and one or more duplicate images from the test dataset. In an embodiment of the present disclosure, the instructions further comprises training, using the intelligence report and the test dataset, the one or more hardware processors, and generating subsequent intelligence reports for subsequent incoming test datasets.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments of the present disclosure provide systems and methods for generating intelligence reports using statistical modeling technique(s) based neural network models. Unlabeled data (or test dataset) is fed into the system for classification (or categorization). The system plots the same on an N-dimensional data space, provides the nearest cluster. The parameters can be scaled and hence weighted and plausible clusters and their corresponding central tendency are obtained. These are validated and fine-tuned using all plausible data except validation set. These clusters are fed into a supervised logit classifiers (e.g., logit model for example, logit regression) which is a network with machine learning (ML) technique(s) embedded into the network (e.g., neural network). The system implements the neural network model(s) (also referred as 'neural network') wherein learning happens in two parts. In an example embodiment, the last layer of classification can occur at client side. Regression provides prediction from the input dataset. The pattern and feature extraction is first layer in the system architecture and based on the feature set the output is predicted in the second layer (can be made available in client or server side).

Figure 1:
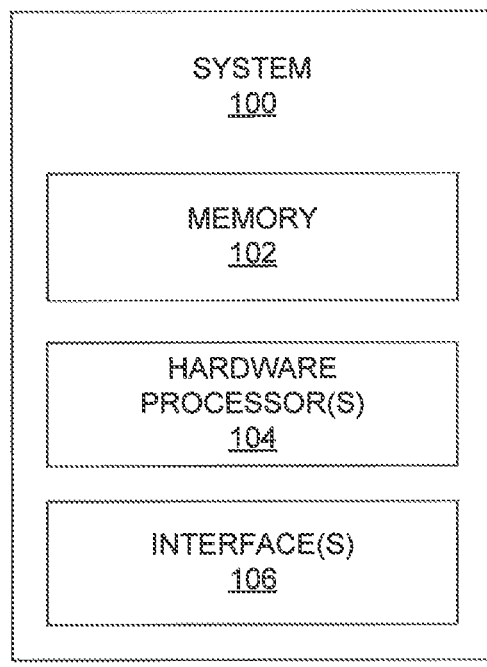
FIG. 1 illustrates an exemplary block diagram of a system for statistical modeling techniques based neural network models for generating intelligence reports according to an embodiment of the present disclosure.
Figure 2:
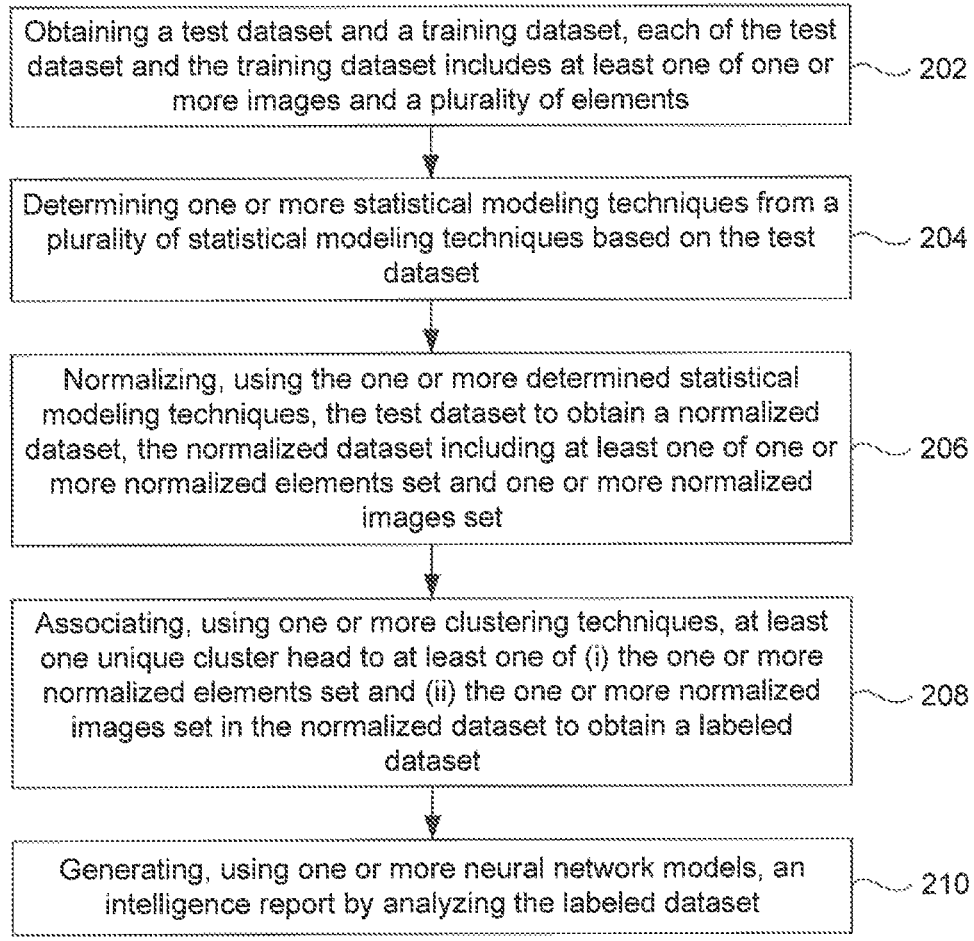
FIG. 2 illustrates an exemplary flow diagram of a method for statistical modeling techniques based neural network models for generating intelligence reports according to an embodiment of the present disclosure.

Referring now to the drawings, and more particularly to FIGS. 1 through 2, where similar reference characters denote corresponding features consistently throughout the figures, there are shown preferred embodiments and these embodiments are described in the context of the following exemplary system and/or method.

FIG. 1 illustrates an exemplary block diagram of a system 100 for statistical modeling techniques based neural network models for generating intelligence reports according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

FIG. 2, with reference to FIG. 1, illustrates an exemplary flow diagram of a method for statistical modeling techniques based neural network models for generating intelligence reports using the system 100 of FIG. 1 in accordance with an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram. In an embodiment of the present disclosure, at step 202, the one or more processors 104 obtain a test dataset and a training dataset. In an embodiment of the present disclosure, the test dataset may comprise a classification dataset, or a regressive (or predictive) dataset. In an embodiment of the present disclosure, the training dataset is obtained based on the type of the test dataset (e.g., an input test dataset). In such scenarios, the test dataset may be introspected to determine an appropriate training dataset. In an embodiment of the present disclosure, the training dataset may be locally stored on the memory 102, or retrieved from an external system (e.g., a client (computing) system or a server system), or through a cloud computing system. In an example embodiment, the test dataset and the training dataset (or trained dataset) comprises at least one of one or more images and a plurality of elements, wherein the elements include at least one of one or more numeric data, and text.

In an embodiment of the present disclosure, at step 204, the one or more processors 104 determine one or more statistical modeling techniques from a plurality of statistical modeling techniques, based on the test dataset and/or the training dataset. In an embodiment of the present disclosure, the plurality of statistical modeling techniques may comprise one or more classification modeling techniques, and one or more regressive modeling techniques. In an embodiment, the one or more classification modeling techniques may include, but not limited to, zero deep sigmoid classifier, support vector machine classifier, K-means clustering classifier, Euclidean Hermitian classifier, Manhattan distances classifier, and so on. In an embodiment, the one or more regressive modeling techniques may include, but not limited to, prediction technique(s), linear regression technique, Deep Belief Networks (DBNs), Relu activated networks, and so on.

The plurality of statistical modeling techniques may be stored and implemented (or executed) on the system 100. In an embodiment of the present disclosure, at step 206, the one or more hardware processors 104 normalize, using the one or more determined statistical modeling techniques, the test dataset to obtain a normalized test dataset. In an embodiment of the present disclosure, the test dataset is normalized by identifying one or more missing elements, one or more missing images, one or more duplicate elements, one or more duplicate images, or duplicate combinations thereof, within the test dataset, and filtering the at least one of (i) the one or more identified missing elements and/or the one or more identified duplicate elements from the test dataset, and (ii) one or more missing images, one or more duplicate images, or duplicate combinations thereof from the test dataset. In an example embodiment, the normalized dataset comprises at least one of one or more normalized elements set and/or one or more normalized images set.

In an embodiment of the present disclosure, at step 208, the one or more hardware processors 104 associate, using one or more clustering techniques, at least one unique cluster head to at least one of (i) the one or more normalized elements set and (ii) the one or more normalized images set in the normalized dataset to obtain a labeled dataset. In an embodiment of the present disclosure, examples of clustering techniques include, but not limited to, k-means clustering technique, Euclidean distance clustering technique, and so on. The system 100 performs analysis (or introspects) across the one or more elements set within the normalized dataset to determine similar elements set, or near similar elements set and assign (or associate) both the determined similar elements set (or near similar elements set) a single unique cluster element (e.g., a cluster head such as a numeric value). Similarly, the system 100 performs analysis (or introspects) across the one or more images set within the normalized dataset to determine similar image set, or near similar images set and assigns (or associates) both the determined similar images set (or near similar images set) a single unique cluster element (e.g., a cluster head such as a numeric value).

In an embodiment of the present disclosure, at step 210, the one or more hardware processors 104 generate, using one or more neural network models, one or more (actionable) intelligence reports based on the labeled dataset. In an embodiment, an intelligence report may refer to a report comprising output data (or resultant output) wherein the system 100 is able (or configured) to analyse (or introspect) the output data (or intelligence report) and take appropriate decision(s) or enable one or more users to provide inputs to the system 100 for performing one or more actions pertaining to the output data from the intelligence report. In an example embodiment, the neural network models are integrated with at least one of one or more trained classification modeling techniques, one or more trained regressive modeling techniques, or combinations thereof, wherein the system 100 employs the integrated modeling techniques based neural network models that performs analyses on the labeled dataset using the at least one of one or more trained classification modeling techniques, one or more trained regressive modeling techniques, or combinations thereof to obtain intelligence report(s). In other words, if the system 100 determines that accuracy derived from the intelligence report is less than a predefined threshold (e.g., x percentage which is predicted based on the amount of training and learning pattern of the system 100), the system may utilize any of the trained statistical modeling techniques (e.g., trained classifier(s)) and execute these within the neural network model to generate a near accurate intelligence report that has an output equal to (or in close proximity of) the pre-defined threshold. The trained statistical modeling technique(s) are integrated by replacing the activations of the penultimate nodes of the neural network model. The system 100 may choose (or select) activation function for slave network to learn the input dataset. The system 100 may modify the structure of the network (neural network model) as per the requirement, and if all weights going from a node is null then the structure may be redefined.

The system adapts to the data based on the above features. In an embodiment of the present disclosure, the pre-defined threshold may be adjusted based on the learning pattern and/or trained dataset available to perform the proposed methodology. This learning by the system 100 may further enable to optimize the steps 202 till 210 to generate accurate or near accurate intelligence reports. In an embodiment of the present disclosure, the intelligence report and the training dataset including the test dataset may be used as a continuous feedback loop for the system 100 to enable the system 100 to learn and select best (or optimal) trained statistical modeling technique(s) and/or best (or optimal) trained clustering technique(s) for generating subsequent optimal intelligence report(s) for subsequent incoming test datasets.

In an example embodiment of the present disclosure, the system 100 has been fed a comma separated values (csv) file as input to train. In an embodiment, the test dataset and the training dataset may be in .csv format. It should be understood to a person skilled (or having ordinary skill) in the art, that other data formats may be implemented in the system 100 to perform the steps of the proposed disclosure. Based on the dataset type, the system 100 may accept one or more inputs from a user that determines a selection of data analytics to be performed (e.g., selection of prediction (or regression), or categorization (or classification). Prediction technique may take a whole real number axis as the range. This technique finds the non-linear relation in the data and extend the same to predict the output. The parent network computes N level deep feature extraction and the intelligence or the learned features (or learnt features) may be used in the system (e.g., either in the same system where the input dataset is processed, or to a server system or client system), wherein regression technique(s) may be implemented (or executed) to obtain a desired output.

In case of classifier or categorization, any choice of classifier may be selected. In an embodiment, the parent network can be an N layer soft-max activated deep network and appropriate steps may be carried out to determine the class of the input dataset.

When the test dataset is identified as a dataset pertaining to regression dataset type, and the classification technique needs to be performed, in such scenarios, the system 100 identifies such dataset type, and converts to an appropriate dataset (e.g., converts regression dataset type to classification dataset type), and then performs the above described steps and classifies the test dataset set accordingly. Similarly, when the test dataset is identified as a dataset pertaining to classification dataset type, and the regression technique needs to be performed, in such scenarios, the system 100 identifies such dataset type, and converts to an appropriate dataset (e.g., converts classification dataset type to regression dataset type), and then performs the above described steps to generate desired output (or report) accordingly.

Experimental results:

Below is a table illustrating a test dataset by way of example:

TABLE 1

| 112 | 19.3 | 27 |
|---|---|---|
| 150 | 30.3 | 10 |
| 91 | 15.9 | |
| 99 | 10 | 39 |
| 110 | 20 | 24 |
| 150 | 30.3 | 10 |
| ... | ... | ... |

The above test dataset from Table 1 is normalized using one or more statistical modeling techniques to obtain a normalized dataset as shown below in Table 2 by way of example:

TABLE 2

| 98 | 10.3 | 41 |
|---|---|---|
| 112 | 19.3 | 27 |
| 99 | 10 | 39 |
| 110 | 20 | 24 |
| 150 | 30.3 | 10 |
| ... | ... | ... |

Upon obtaining the normalized dataset as shown above, the system 100 implements optimal clustering technique(s) and associates a unique cluster head to each elements set in the normalized dataset and a labeled dataset is generated. Table 3 below depicts a representation of the labeled dataset which is illustrated by way of example:

TABLE 3

| Cluster Head | Elements set | | |
|---|---|---|---|
| 1 | 98 | 10.3 | 41 |
| 3 | 112 | 19.3 | 27 |
| 2 | 91 | 15.9 | 61 |
| 1 | 99 | 10 | 39 |
| 3 | 110 | 20 | 24 |
| 4 | 150 | 30.3 | 10 |
| N | ... | ... | ... |

Upon generating the labeled dataset, the system 100 performs analysis (or introspects) on the labeled data using one or more neural network models integrated with statistical modeling technique(s) (e.g., trained classifier(s), etc.) and generates intelligence report(s). Below Table 4 is an illustrative example of intelligence report generated by the statistical Modeling techniques based Neural Network models:

TABLE 4

| 0.03 | 0.42 | 0.212 |
|---|---|---|

The experimental results for test dataset comprising elements, for example, numeric values as shown in Table 1, Table 2, and Table 3, is described for illustrative purpose and for better understanding of the embodiments of the present disclosure, it should be understood to person skilled (or having ordinary skill) in the art, that the embodiments of the present disclosure may be implemented for other input test datasets for example, images dataset, text description, and should not be construed as limiting the scope of the embodiments herein.

The embodiments of the present disclosure provide systems and methods for generating intelligence reports using statistical modeling techniques based neural network models. The embodiments of the present disclosure enable the system 100 to process huge amount of data and can find non-periodic (or even scarce) patterns. The system 100 is further configured to perform iterative processes thus increasing the accuracy in output generated or derived from the intelligence reports. The embodiments of the present disclosure performs the above methodology wherein the computation enhances the Graphical Processing Unit (GPU) thereby enabling the system to provide better results with the help of training data. The system 100 is further configured to be integrated with (or can be enabled with cloud environment) cloud environment based GPU or multi core processors which smoothens up the functioning.

Different modeling techniques fit different data types. Depending on the type of data, the system 100 selects (or determines) appropriate statistical modeling technique(s) and/or clustering technique(s) and models parameters of the incoming (test) dataset. Unlike conventional systems where different systems are used for processing different dataset types, the embodiments of the present disclosure enable the same system 100 to adapt towards different types of datasets, wherein the system learns (initially supervised, and later adapts unsupervised learning approach) by identifying the learning patterns thus reducing the computational requirements. This enables the system 100 can decide which machine learning technique(s) (or statistical modeling technique(s) and/or clustering technique(s)) can learn the provided data set in the best manner. This makes the system 100 scalable, and adopt to any new technique(s) with minimal intervention (or efforts). The ability of the system 100 to adopt to technique(s) being implemented leads to reduced computational power.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
    obtaining (202), via one or more hardware processors a test dataset and a training dataset, wherein the test data set and the training dataset comprises at least one of one or more images and a plurality of elements, wherein the training dataset corresponds to the test dataset trained over a period of time, and wherein the test dataset is an unlabeled dataset;
    determining (204), via the one or more hardware processors, one or more statistical modeling techniques from a plurality of statistical modeling techniques, based on the test dataset;
    normalizing (206), using the one or more determined statistical modeling techniques, the test dataset to obtain a normalized dataset, wherein the normalized data set comprises at least one of one or more normalized elements set and one or more normalized images set, and wherein normalizing the test dataset comprises identifying and filtering at least one of (i) one or more missing elements and one or more duplicate elements from the test dataset, and (ii) one or more missing images and one or more duplicate images from the test dataset;
    associating (208), using one or more clustering techniques, a first unique cluster head to (i) the one or more normalized elements set and associating a second unique cluster head to (ii) the one or more normalized images set in the normalized dataset to obtain a labeled dataset, wherein associating involves performing analysis across at least one of the one or more elements set and images set, within the normalized dataset, to determine similar elements set, and assigning the determined similar elements set to the second unique cluster head;
    generating (210), using one or more neural network models, an intelligence report by analyzing the labeled dataset to identify and obtain non-periodic patterns and to perform iterative analysis on the generated intelligence reports, wherein identifying non-periodic patterns in the labeled dataset reduces computation requirement of the processor in processing large test datasets;
    training, using the intelligence report and the test dataset, the one or more hardware processors; and
    generating subsequent intelligence reports for subsequent incoming test datasets.

2. The processor implemented method of claim 1, wherein the plurality of statistical modeling techniques comprises one or more classification modeling techniques, and one or more regressive modeling techniques.

3. A system comprising:
    a memory (102) storing instructions;
    one or more communication interfaces (106); and
    one or more hardware processors (104) coupled to the memory (102) using the one or more communication interfaces (106), wherein the one or more hardware processors (104) are configured by the instructions to:

obtain a test dataset and a training dataset, wherein the test dataset and the training dataset comprises at least one of one or more images and a plurality of elements, wherein the training dataset corresponds to the test dataset trained over a period of time, and wherein the test dataset is an unlabeled dataset;

determine one or more statistical modeling, techniques from a plurality of statistical modeling techniques, based on the test dataset;

normalize, using the one or more determined statistical modeling technique, the test dataset to obtain a normalized dataset, wherein the normalized dataset comprises at least one of one or more normalized elements set and one or more normalized images set, and wherein normalizing the test dataset comprises identifying and filtering at least one of (i) one or more missing elements and one or more duplicate elements from the test dataset, and (ii) one or more missing images and one or more duplicate, images from the test dataset;

associate using one or more clustering techniques, a first unique cluster head to (i) the one or more normalized elements set and associate a second unique cluster head to (ii) the one or more normalized images set in the normalized dataset to obtain a labeled dataset, wherein associating involves performing analysis across at least one of the one or more elements set and images set, within the normalized dataset, to determine similar elements set, and assigning the determined similar elements set to the second unique cluster head;

generate, using one or more neural network models, an intelligence report by analyzing the labeled dataset to identify and obtain non-periodic patterns and to perform iterative analysis on the generated intelligence reports, wherein identifying non-periodic patterns in the labeled dataset reduces computation requirement of the processor in processing large test datasets;

train, using the intelligence report and the test dataset, the one or more hardware processors; and generate subsequent intelligence reports for subsequent incoming test datasets.

4. The system of claim 3, wherein the plurality of statistical modeling techniques comprises one or more classification modeling techniques, and one or more regressive modeling techniques.

5. One or more non-transitory computer readable medium comprising one or more instructions which when executed by one or more hardware processors causes:

obtaining, a test dataset and a training dataset, wherein the test dataset and the training dataset comprises at least one of one or more images and a plurality of elements, wherein the training dataset corresponds to the test dataset trained over a period of time, and Wherein the test dataset is an unlabeled data set;

determining one or more statistical modeling techniques from a plurality of statistical modeling techniques, based on the test dataset;

normalizing, using the one or more determined statistical modeling techniques, the test dataset to obtain a normalized dataset, wherein the normalized dataset comprises at least one of one or more normalized elements set and one or more normalized images set, and wherein normalizing the test dataset comprises identifying and filtering at least one of (i) one or more missing elements and one or more duplicate elements from the test dataset, and (ii) one or more missing images and one or more duplicate images from the test dataset;

associating, using one or more clustering techniques, a first unique cluster head to the one or more normalized elements set and associating a second unique cluster head to (ii) the one or more normalized images set in the normalized data set to obtain a labeled dataset, wherein associating involves performing analysis across at least one of the one or more elements set and images set, within the normalized dataset, to determine similar elements set, and assigning the determined similar elements set to the second unique cluster head;

generating, using one or more neural network models, an intelligence report by analyzing the labeled dataset to identify and Obtain non-periodic patterns and to perform iterative analysis on the generated intelligence reports, wherein identifying non-periodic patterns in the labeled dataset reduces computation requirement of the processor in processing large test datasets;

training, using the intelligence report and the test dataset, the one or more hardware processors; and generating subsequent intelligence reports for subsequent incoming test datasets.

6. The one or more non-transitory computer readable medium of claim 5, wherein the plurality of statistical modeling techniques comprises one or more classification modeling techniques, and one or more regressive modeling techniques.

* * * * *